US006391268B1

(12) United States Patent
Berry et al.

(10) Patent No.: US 6,391,268 B1
(45) Date of Patent: May 21, 2002

(54) ENERGY-SAVING HEAVY CRUDE OIL EMULSION-TREATING APPARATUS

(75) Inventors: J. Patrick Berry; Mark N. Smithdorf; Stewart J. Mulvey, all of Alberta (CA)

(73) Assignee: Kvaerner Process Systems, Inc., Calgary (CA)

( * ) Notice: Subject to any disclaimer, the term of this patent is extended or adjusted under 35 U.S.C. 154(b) by 0 days.

(21) Appl. No.: 09/414,930

(22) Filed: Oct. 12, 1999

(51) Int. Cl.[7] ........................... B01J 19/08; C25B 13/02

(52) U.S. Cl. .................. 422/186.04; 422/186; 204/284; 204/288

(58) Field of Search ................................ 204/284, 288; 422/186.04, 186

(56) References Cited

U.S. PATENT DOCUMENTS

| | | | | |
|---|---|---|---|---|
| 3,255,571 | A | | 6/1966 | Walker et al. |
| 3,547,801 | A | | 12/1970 | Albright et al. |
| 3,574,085 | A | | 4/1971 | Woelflin |
| 3,664,093 | A | | 5/1972 | Murdock, Sr. |
| 3,844,743 | A | | 10/1974 | Jones |
| 3,910,769 | A | * | 10/1975 | Mayer et al. ............... 422/142 |
| 4,049,535 | A | | 9/1977 | Winslow, Jr. |
| 4,252,631 | A | | 2/1981 | Hovarongkura et al. |
| 4,257,895 | A | | 3/1981 | Murdock |
| 4,329,159 | A | | 5/1982 | Bull |
| 4,454,016 | A | | 6/1984 | Rabinowitz et al. |
| 4,801,370 | A | | 1/1989 | Arnesen |
| 4,919,777 | A | * | 4/1990 | Bull |
| 5,064,448 | A | | 11/1991 | Choi |
| 5,147,045 | A | | 9/1992 | Chi et al. |
| 5,464,522 | A | | 11/1995 | Edmondson |
| 5,865,992 | A | | 2/1999 | Edmondson |

* cited by examiner

*Primary Examiner*—Kishor Mayekar
*Assistant Examiner*—Thao Tran
(74) *Attorney, Agent, or Firm*—James G. O'Neill

(57) ABSTRACT

A treater for electrostatically separating emulsified water from oil during longitudinal flow through a horizontally elongated coalescing section has a number of baffles with adjacent electrostatic wing grids therein. The electrostatic wing grids are externally connected to two or more transformers so that a higher voltage may be applied to subsequent grids along the coalescing section. Each of the electrostatic wing grids includes a front face and perpendicular side edges and a perpendicular bottom edge to extend the electrostatic field out beyond the front face, so as to enhance the electrostatic action and more efficiently remove water from the emulsion. The baffles preferably extend downwardly to a water/oil interface, so as to increase the efficiency of the emulsion flowing through the coalescing section and ensure that the electrostatic field is applied to the emulsion.

11 Claims, 2 Drawing Sheets

ENERGY-SAVING HEAVY CRUDE OIL EMULSION-TREATING APPARATUS

BACKGROUND OF THE INVENTION

1. Field of the Invention

This invention relates generally to emulsion-treating (dehydration) apparatus, and, more particularly, to an improved energy-conserving electrostatic coalescer for separating emulsified brine from oil during longitudinal flow through a horizontally elongated metal tank.

2. Description of Related Art

It is well known that petroleum as it is naturally produced from an underground formation must be treated so as to separate and remove entrained gas and emulsified brine or water, in order to render the oil pipelineable. Various techniques and processes have heretofore been employed in order to minimize treatment time and avoid high-energy consumption. In particular, U.S. Pat. No. 4,329,159 ("'159") to Bull, entitled, "Energy Saving Heavy Crude Oil Emulsion Treating Method and Apparatus for Use Therewith" describes a method and apparatus comprising an elongated horizontal cylindrical tank, divided by internal partitions, into compartments through which the petroleum will sequentially flow. Burner-fired heaters are normally included in an upstream heater section for heating the emulsion to a desired temperature, during which most of the entrained gas and some of the brine will separate from the emulsion. The partially de-emulsified brine then flows into a coalescing section, encountering a series of baffles adapted to encourage even flow of fluids and to avoid the formation of flow channels within the fluid body. Additionally, high-potential electrostatic fields are applied by energizing grids with high voltage potential. The grids are adjacent to each grounded baffle, which creates the fields between each grid and grounded baffle. The resultant electrostatic fields coalesce the droplets of brine remaining in the oil into drops of sufficient size and weight that they flow downwardly by gravity to the bottom of the coalescing section for removal. Oil substantially free of brine, then flows over a wall into a reservoir where the brine-free oil may be intermittently or continuously discharged, without affecting the liquid level in the treater.

While the use of the baffles and the electrostatic elements in the '159 patent have resulted in enhanced separation of the oil and brine, the invention herein described discloses further improvements in which the metallic apertured grids have been expanded so as to take up more of the flow area, and include longitudinally-extending sections or wings that provide a more even and larger electrostatic zone between the grid edges and the wall of the vessel (grounded) to improve the coalescence of the brine within the emulsion flowing through the treater.

In addition, to further improve and enhance the separation of the oil and brine, the present invention includes the use of multiple transformers. After conducting a number of experiments, it was found that wet emulsion is much more conductive than lean (dry) emulsion, and will, therefore, draw a much larger current through it as it flows through an electrostatic field. That is, an emulsion flowing through a coalescing section entering a first electrostatic field will contain the most brine and, therefore, the first electrostatic field will draw the highest current. This current load will then determine or set the applied voltage to all the grids in known electrostatic coalescers, because there is only one power feed from a single transformer used therein. The transformers, used to supply high-voltage to the electrostatic grids in known treaters, are self-protected (reactive), and, therefore, reduce the output voltage as the current increases. Brine droplets in a wet emulsion will coalesce very easily under a weak electrostatic field, because the droplet population density is high and the space between droplets is small. Therefore, reduced voltage on a first grid does not hamper the coalescing action. However, as the emulsion travels through the coalescing section and the brine is coalesced therefrom, the reduced voltage on the subsequent electrostatic grids reduces the effectiveness of the applied electrostatic fields. The sequentially leaner emulsion traveling through the sequential grids in a treater actually requires much stronger electrostatic fields to coalesce more widely-dispersed brine droplets contained in the emulsion being treated. The emulsion flowing from a first electrostatic grid-to subsequent electrostatic grids becomes drier as water coalesces and is separated out. Therefore, in order to sustain effective coalescing at each electrostatic field, the present invention increases the voltage at each sequential grid. This is provided by using two or more transformers and power feeds to the electrostatic grids. Each electrostatic grid and transformer is operated independently, and is set at a different voltage. That is, the first stage grid will be set at a low voltage to handle wet emulsion, while the subsequent grids would be set at increasingly higher voltages to handle leaner emulsions as the emulsion travels through the coalescing section. The last field in the series will coalesce the last small quantities of water or brine remaining in the oil emulsion, by having the highest voltage applied thereto.

The present invention also has the baffles before each electrostatic grid extending all the way down to the oil/water interface in the treater section, to overcome the problem found with the '159 patent technology. That is, wet emulsion tends to bypass the electrostatic field zone by flowing under the baffles and electrostatic grids, along the surface of the oil/water interface. By lowering the ends of the baffles to the oil/water interface, the hydraulic bypassing is reduced, and thereby increasing the efficiency and effectiveness of the present invention.

In addition, in a further embodiment of the present invention, a first distribution baffle, before the first electrostatic grid, is provided with circular holes in an offset triangular pattern with a total open area of 8%–16%. These circular holes in the triangular pattern promote more uniform horizontal plug flow of the emulsion through the treater, so that all of the emulsion is exposed to the electrostatic fields uniformly.

Therefore, it can be seen that the present invention meets an existing need in the art for the improved and more efficient treating of emulsified oil as it flows through a treater section by the use of improved electrostatic grids, the application of increasing voltage to sequential grids, together with improved and modified baffles for better controlling the flow of the emulsion through the treater.

SUMMARY OF THE INVENTION

Accordingly, it is a general object of the present invention to provide an improved apparatus for treating (dehydrating) an emulsion. It is a principle object of the present invention to provide an improved apparatus for more efficiently treating oil, gas, water emulsions flowing through a coalescing section of a treater. It is another particular object of the present invention to provide improved electrostatic elements for more effectively coalescing out droplets of brine in an oil/brine emulsion flowing through a coalescing section of a treater. It is yet another particular object of the present invention to provide an improved apparatus for achieving substantially complete separation of brine from oil by utilizing improved electrostatic elements having wing sections thereon. And, it is a further particular object of the present invention to provide an improved electrostatic coalescer having more efficient electrostatic elements, elongated baffle elements used in conjunction with such electrostatic elements, and variable voltage means to apply varying voltages to sequentially-placed electrostatic elements in a horizontal separating vessel.

These and other objects and advantages of the present invention are achieved by providing a horizontal vessel comprised of at least a coalescing section. The coalescing section has a plurality of electrostatic grids suspended therein adjacent to a plurality of baffles extending entirely across the flow path of an emulsion traveling longitudinally through the horizontal vessel. The electrostatic grid elements are comprised of wing-type grids, having a plurality of edges, which extend longitudinally along the flow path to increase the electrostatic efficiency thereof. In a second embodiment of the present invention there is provided a plurality of transformer means for providing different voltages to the sequentially-spaced grids so as to increase the efficiency thereof in separating emulsified water from the flowing oil.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

Figure 1:
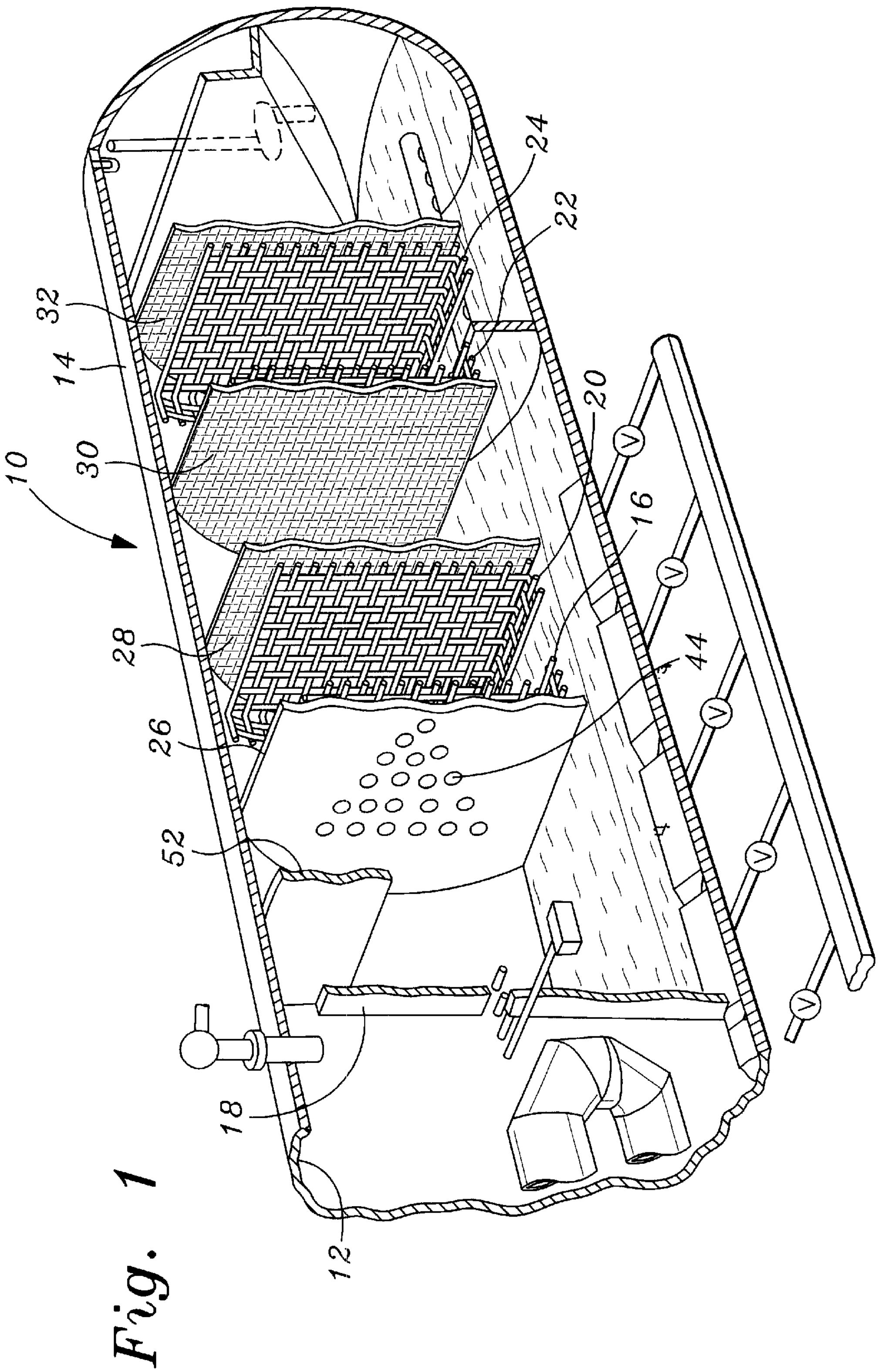
FIG. 1 is a partial cross sectional perspective view through a coalescing section of a horizontally-extending elongated tank oil treater showing a preferred embodiment of a plurality of improved electrostatic grids adjacent to improved baffles of the present invention.
Figure 2:
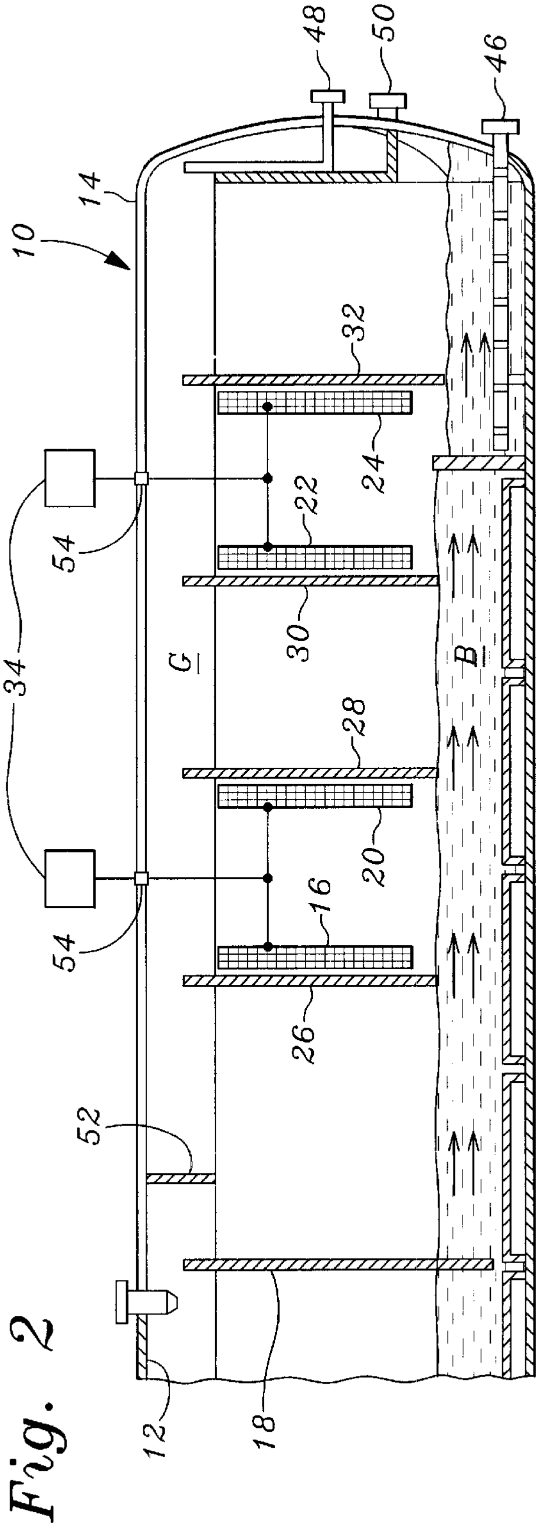
FIG. 2 is a partial side elevational view of the coalescing section of FIG. 1.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for an improved and simplified emulsion treater (hereinafter referred to as a "TREATER"), which may or may not have a heater section such as set forth in U.S. Pat. No. 4,329,159 ("'159") to Bull. The present invention is an improvement to the coalescing apparatus set forth in the '159 patent, the disclosure of which '159 patent is incorporated herein, in its entirety, by this reference thereto. While treatment of crude oil is described as the primary use for this invention, it is to be understood that it is also applicable in treating and/or coalescing any liquid medium that requires flow control in a horizontal direction.

Referring now to the drawings, the present invention is utilized in an elongated, horizontal metal tank or vessel 10 of the type disclosed in the '159 patent. This elongated vessel 10 may have a first heater section, only part of which is shown, or may consist only of a treatment or coalescing section 14. If a heater section is used, the coalescing section 14 is separated by a bulkhead 18 from the heater section. A foam-removing assembly 52 is disposed in the coalescing section 14, downstream of the bulkhead 18.

The apparatus of the present invention provides a more efficacious separation of a viscous emulsion E into its respective components, namely, produced brine B (salt water, heavy mineralized water or fresh water), gas G, and substantially brine or water-free oil O, which exits the coalescing section at the second end of 14 through a gas outlet 48, brine-free oil outlet 50 and a brine outlet 46, in the same manner as disclosed in the '159 patent. This more efficient and improved coalescense is accomplished by the use of a plurality of electrostatic wing grids 16, 20, 22, 24, having a plurality of novel baffles 26, 28, 30, 32 placed adjacent thereto and either in front of or behind (upstream or downstream) of the wing grids. It is to be understood, that two or more grids may be used in the present invention. Each of the electrostatic wing grids 16, 20, 22, 24 are powered by one or more transformers 34, which apply the lowest voltage to handle wet emulsion at wing grid 16, a higher voltage at wing grid 20, a still higher voltage at wing grid 22, and the maximum desired voltage at wing grid 24 to handle the very lean emulsion and coalesce the remaining small quantities of brine left in the emulsion as it passes through baffle 32 and wing grid 24. That is, the emulsion E traveling from the bulkhead 18 to the downstream or outer end of the coalescing section 14 is subjected to increasingly strong electrostatic fields by the electrostatic wing grids, to more efficiently remove the brine therefrom, and produce a substantially brine-free oil for exiting through the outlet 50. In multiple transformer installations, with many grids, each transformer may be connected to 2 or 3 grids.

The first baffle 26 is preferably provided with circular holes in an offset triangular pattern indicated by 44, with a total open area of 8%–16% of the total area of the baffle 26. This promotes more uniform horizontal plug flow through the baffle and the first electrostatic wing grid 16, as well as the remaining baffles 28, 30, 32 and wing grids 20, 22, 24 so that the emulsion E is exposed to the increasingly strong electrostatic fields, more uniformly, as it flows through the treater section 14.

Figure 3:
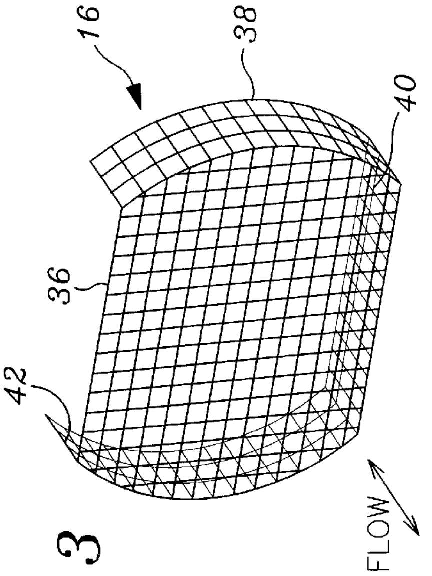
FIG. 3 is an enlarged, perspective view of one of the wing electrostatic grid elements of the present invention.

Turning now to FIG. 3, there shown is a preferred embodiment of an electrostatic wing grid, such as 16, having an enlarged vertical surface 36, which is totally immersed in the emulsion E, and which preferably is held parallel to the baffle 26 in a predetermined spaced relationship (typically 3"–9"). This enlarged vertical surface 36 preferably has curved outer ends or sides (to conform to the shape of the coalescing section 14), and flat bottom and top portions, which must be held away from the oil/gas interface and the oil/water interface traveling through the coalescing section 14 so that no short circuits occur. The two curved ends, and the bottom of the enlarged vertical surface 36 are provided with longitudinally extending portions or wings 38, 40, 42. That is, portions 38, 40 and 42 are referred to as wings, which extend perpendicularly to the enlarged vertical surface 36, for a limited distance, depending on the spacing of the grids and baffles (approximately 3"–9") from each other, so as to provide an enhanced electrostatic field which extends perpendicularly to the enlarged vertical surface and along the lines of flow of the emulsion through the coalescing section 14. With this configuration, the electrostatic field is axially extended beyond the enlarged vertical face or surface 36, so as to improve the coalescence of brine or water within the emulsion flowing through each grid 16, 20, 22, 24. The wing extensions 38, 40 and 42, together with the increased voltage applied to the sequential wing grids 20, 22 and 24 provide better and more efficient results in coalescing substantially all droplets of brine/water suspended within the emulsion E to provide a substantially brine/water-free oil O at the outlet end of the coalescer 14.

The baffles 26, 28, 30, 32 of the present invention extend all the way to the inner walls, and down to the oil/brine water interface, while the electrostatic grids 16, 20, 22 and 24 must be spaced approximately 3"–9" away from the internal walls of the coalescer 14, and approximately 6 inches to 12 inches above the oil/water interface to prevent any possibility of short circuiting of the grids. The baffles, except for the first baffle 26, are preferably open-wire mesh, so as to be substantially hydraulically invisible. High-voltage varying from about 600–1,000 v/in (volts per inch of space between grid and baffle) at the first electrostatic wing grid 16, to about 4,000 v/in at the last electrostatic wing grid 24, is applied by the transformers 34. The longitudinally extending wing portions of the grids provide a secondary field along the sides and bottom of the emulsion traveling through the coalescer 14, providing what may be called a "perimeter zone", for treating the emulsion, after it passes by each of the wing grid front faces or surfaces. It is to be understood that the transformers 34 are a plurality of separate transformers, which are connected to each of the sequentially mounted electrostatic wing grids, so as to provide the desired voltages to each grid. In a preferred embodiment of the invention, two transformers and separate power feeds to dual adjacent electrostatic grids are used with each of the transformers operating independently, so as to set the different voltages for the grids.

It, therefore, can be seen that the electrostatic grids of the present invention provide and/or produce improved electrostatic fields to thereby improve dehydration performance of an emulsion, such as petroleum passing therethrough. Because the wing grids are not flat, but include extending side edges or portions, they provide more even and larger electrostatic zones between the grid edges and the grounded wall of the vessel. Additionally, the application of higher voltages to subsequent wing grids sustains the effective coalescing action at each grid because the increased voltage is applied to a progressively leaner emulsion. Furthermore, the extending of the baffles down to the oil/water interface reduces hydraulic bypassing of the electrostatic zone, while the providing of the first distribution baffle with an offset triangular pattern over only approximately 8%–16% of its total area promotes more uniform, horizontal flow of the emulsion so that all of the emulsion is exposed to the progressively stronger electrostatic field, in a uniform manner.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An emulsion separating treater for separating emulsified water droplets from an emulsion, the emulsion separating treater, including a generally elongated metal tank constructed and arranged for flow of emulsion therethrough, and comprising a coalescing section having the following elements in combination:

a plurality of baffles supported within the coalescing section in spaced relationship;

a plurality of sequential electrostatic grid elements supported within the treater section and adjacent to the plurality of baffles;

means for providing high voltage to each of the plurality of sequential electrostatic grid elements; and wherein each of the plurality of sequential electrostatic grid elements includes a plurality of wing elements extending perpendicularly to an enlarged face portion thereof along and parallel to a longitudinal axis of the treater section to provide an electrostatic zone between each of the plurality of wing elements, an interior wall of the coalescing section, and an oil/water interface.

2. The treater of claim 1 wherein there are three wing elements, two of the three wing elements being connected to side edges of the enlarged face portion and one of the three wing elements being connected to a bottom edge of the enlarged face portion.

3. The treater of claim 2 wherein the means for providing voltage is comprised of a plurality of transformers electrically connected to at least one of the plurality of sequential electrostatic grid elements so that a sequentially increasing voltage is applied to the plurality of sequential electrostatic grid elements as the emulsion passes through the coalescing section.

4. The treater of claim 3 wherein each of the plurality of baffles extends downwardly to the oil/water interface in the coalescing section so as to prevent the emulsion flowing through the coalescing section from bypassing an electrostatic zone for each of the plurality of sequential electrostatic grid elements.

5. The treater of claim 4 wherein a first of the plurality of baffles in the treater section includes a plurality of circular holes in an offset triangular pattern with a total open area of approximately 8%–16% of the entire area of the first baffle, so as to promote more uniform, horizontal plug flow through the first baffle and the coalescing section.

6. A treater for separating emulsified water droplets from an emulsion of water and oil, which separating treater includes a generally elongated metal tank constructed and arranged for flow of the emulsion therethrough, comprising, in combination:

a heater section and a coalescing section;

a plurality of sequentially mounted baffles extending generally between an upper surface and a lower surface of an emulsion zone in the coalescing section;

a plurality of sequentially mounted electrostatic wing grids placed adjacent to the plurality of sequentially mounted baffles so as to apply a series of electrostatic fields to the emulsion traveling through the coalescing section;

each of the plurality of sequentially mounted electrostatic wing grids include longitudinally extending wing portions which are perpendicular to an enlarged face portion; the wing portions being connected to edges of the enlarged face portion, and being substantially parallel to a longitudinal axis of the coalescing section; and a plurality of transformers connected to the plurality of sequentially mounted electrostatic wing grids for applying a different voltage to each of the plurality of sequentially mounted electrostatic wing grids, which different voltage increases at each of the plurality of sequentially mounted electrostatic wing grids as the emulsion travels through the coalescing section from an upstream end adjacent the heater section to a downstream end, away from the heater section.

7. The treater of claim 6 wherein there are three wing elements, two of which are connected to side edges of the enlarged face portion and one of which is connected to a bottom edge of the enlarged face portion.

8. The treater of claim 7 wherein a first of the plurality of sequentially mounted baffles includes a plurality of circular holes formed in an offset triangular pattern so as to form a total open area of approximately 8%–16% of the total area of the first of the plurality of sequentially mounted baffles.

9. An emulsion separating treater for separating emulsified water droplets from an oil/water emulsion, the emulsion separating treater including a generally elongated metal tank constructed and arranged for flow of the oil/water emulsion therethrough, and wherein the emulsion separating treater has a heater section and a coalescing section, with the coalescing section comprising:

a first upstream end adjacent the heater section and a second downstream end, away from the heater section;

a plurality of baffles sequentially mounted in the coalescing section between the first upstream end and the second downstream end;

a plurality of electrostatic wing grids sequentially mounted in the coalescing section; one of the plurality of electrostatic wing grids being held adjacent to each of the plurality of sequentially mounted baffles, between the first upstream end and the second downstream end;

each of the plurality of electrostatic wing grids including an enlarged front face and longitudinally extending edge portions, which longitudinally extending edge portions are substantially parallel to a longitudinal axis of the coalescing section;

each of the plurality of baffles extending down to an oil/water interface in the coalescing section; and a plurality of transformers connected to the plurality of electrostatic wing grids so as to provide increasing voltage to the plurality of electrostatic grids as the emulsion travels from the first upstream end to the second downstream end.

10. The treater of claim 9 wherein there are three wing elements, two of the three wing elements being connected to side edge portions of the enlarged face portion and one of the three wing elements being connected to a bottom edge portion of the enlarged face portion.

11. The treater of claim 10 wherein a first of the plurality of baffles includes a plurality of circular holes formed in an offset triangular pattern so as to form a total open area of approximately 8%–16% of the total area of the first of the plurality of baffles.

* * * * *